(12) United States Patent
Saito

(10) Patent No.: US 6,780,312 B2
(45) Date of Patent: Aug. 24, 2004

(54) FILTRATION APPARATUS

(75) Inventor: Yasuhiro Saito, Kanagawa (JP)

(73) Assignee: Nihon Genryo Co., Ltd. (JP)

( * ) Notice: Subject to any disclaimer, the term of this patent is extended or adjusted under 35 U.S.C. 154(b) by 28 days.

(21) Appl. No.: 09/979,104

(22) Filed: Nov. 19, 2001

(65) Prior Publication Data

US 2003/0010699 A1 Jan. 16, 2003

Related U.S. Application Data

(63) Continuation-in-part of application No. PCT/JP01/03510, filed on Apr. 24, 2001.

(30) Foreign Application Priority Data

Apr. 27, 2000 (JP) .................................. 2000-126784

(51) Int. Cl.[7] .............................................. B01D 24/46
(52) U.S. Cl. ..................... 210/189; 210/268; 210/269; 210/276
(58) Field of Search ................. 210/792, 793, 210/794, 795, 796, 189, 268, 269, 270, 275, 276

(56) References Cited

U.S. PATENT DOCUMENTS

| | | | | |
|---|---|---|---|---|
| 3,667,604 A | | 6/1972 | Lagoutte ...................... | 210/136 |
| 4,197,201 A | * | 4/1980 | Hjelmner et al. ............ | 210/189 |
| 4,496,464 A | * | 1/1985 | Hensley ....................... | 210/792 |
| 4,787,987 A | * | 11/1988 | Hensley ...................... | 210/792 |
| 4,966,698 A | * | 10/1990 | Hensley ...................... | 210/269 |
| 5,277,829 A | * | 1/1994 | Ward ........................... | 210/792 |
| 5,407,574 A | * | 4/1995 | Hensley ....................... | 210/269 |
| 5,573,663 A | * | 11/1996 | Junius et al. ................ | 210/189 |
| 5,945,005 A | | 8/1999 | Junius et al. ................ | 210/786 |
| 6,273,106 B1 | | 8/2001 | Saitoh .......................... | 134/65 |
| 2001/0018921 A1 | | 9/2001 | Saitoh ......................... | 134/25.4 |

FOREIGN PATENT DOCUMENTS

| | | |
|---|---|---|
| EP | 0560215 A1 | 3/1993 |
| JP | 31491 | 7/1915 |
| JP | 31491 | 9/1917 |
| JP | 61-204049 | 9/1986 |
| JP | 63-098704 | 6/1988 |
| JP | 08215509 | 8/1996 |

* cited by examiner

*Primary Examiner*—Ivars C. Cintins
(74) *Attorney, Agent, or Firm*—Finnegan, Henderson, Farabow, Garrett & Dunner, LLP

(57) ABSTRACT

A filtration apparatus comprising a container that houses a filtration tank to which contaminated water is supplied, a cleansing tank, and a screw conveyor disposed within said cleansing tank is provided. Filtration media is housed within the cleansing tank and the container. The cleansing tank has lateral surface openings, lower openings, and an upper opening. When the screw conveyor rotates, filtration media as well as water (contaminated water) is conveyed upward from the lower openings to the upper opening while being agitated. At the same time, filtration media circulates between the cleansing tank and the container and is cleansed. When cleansing is complete, a backwash water supply pump backwashes water, and expels contaminants separated and removed from the filtration media out of the container by an expulsion pump. Lateral surface doors close lateral surface openings by drive means only during cleansing (agitation). This structure increases the filtration area.

13 Claims, 11 Drawing Sheets

MAGNIFIED SECTIONAL VIEW TAKEN ALONG LINE C-C

VIEW TAKEN ALONG ARROW D

DETAILED VIEW OF PORTION A

DETAILED VIEW OF PORTION B

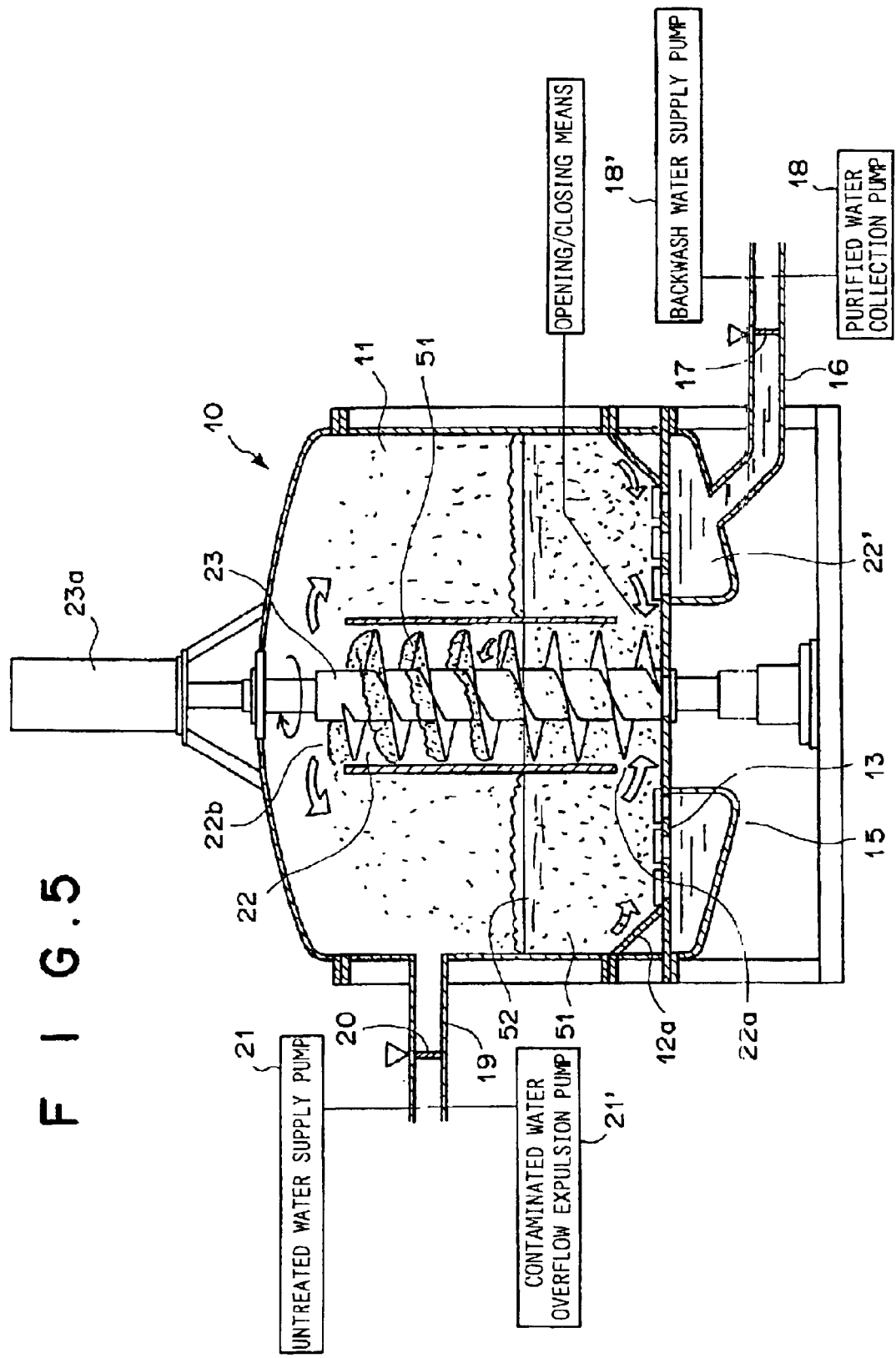

FILTRATION APPARATUS

This application claims the benefit of priority under 35 U.S.C. §120 based on PCT International Application No. PCT/JP01/03510, filed Apr. 24, 2001, of which this application is a continuation-in-part, and the benefit of priority under 35 U.S.C. §119 based on Japanese Patent Application No. 2000-126784, filed Apr. 27, 2000.

BACKGROUND OF THE INVENTION

1. Field of the Invention

The present invention relates to a filtration apparatus that filters liquids such as water.

2. Description of the Related Art

Conventional water purification processes at large scale water treatment plants involve adding chemicals to untreated water drawn from rivers, lakes, ponds, or wells to consolidate the suspended matter therein to a size that causes said consolidated matter to deposit on the bottom. The supernatant water is skimmed and sent to a filtration reservoir, where it is passed through filtration media such as filtration sand to remove the finer suspended matter. This water is then disinfected with chlorine.

However, if water is filtered utilizing filtration media in this manner over a long period of time, the filtering efficiency decreases due to the pollutants in the water (contaminants such as sludge, hereinafter referred to as contaminants) attaching to the filtration media, among other reasons. Therefore, it becomes necessary to periodically cleanse the filtration media. As cleansing methods of filtration media, surface cleaning, which washes the surface of a sand layer by hitting it with water sprayed from a nozzle, and backwash, which forces purified water into a filtration reservoir from a lower pressure compartment, thereby floating the filtration sand grains, causing them to scrub against each other, were in common use.

However, the surface cleaning and backwash methods described above utilize the effects of stream shear, and cannot cleanse the filtration media with satisfactory efficacy. Problems arise from repeated use over a period of time such as: the reduction of space among the filtration media due to the progressive thickening of particle size from contaminant accumulation thereon, clogging due to the separation of materials that had been attached to the filtration media, and the leaking of the contaminants themselves.

Conventionally these problems were dealt with by, for example, increasing the frequency of the backwash process. However, if the backwash process is repeated over a long period of time, the water pressure thereof influences even the gravel layer which supports the filtration media, creating areas of different thickness in said layer, which is optimally flat and of an even thickness. In this case, it is necessary to perform a regeneration process, which involves: ceasing the total operation of the filtration reservoir, removing the filtration media, correcting the discontinuities in thickness of the gravel layer), replacing the filtration media with new filtration media, or with the polluted filtration media which has been cleansed. However, the regeneration process is extremely costly, and as during said process the filtration reservoir is not operating, it leads to a decrease in water treatment efficiency, there is a strong demand on the part of the water treatment plant to space the intervals between regeneration processes as long as possible.

The applicant of the present invention, in order to meet this demand, has developed and proposed a sand cleansing apparatus which cleanses polluted filtration media in a shorter time and with a higher degree of cleansing ability (Japanese Unexamined Patent Publication Nos. 10(1998)-109051 and 11(1999)-057526), which has been utilized and praised by those in the field. This sand cleansing apparatus comprises: a sand receiving opening for receiving filtration media drawn from a filtration reservoir in its upper portion; a cleansing tank which stores sand and cleansing water having a sand extraction opening; a agitating tank erected within said cleansing tank having openings on the upper and lower ends thereof; and a screw conveyor which rotates within said agitating tank. The grains of sand are brought upward by the screw conveyor along with the cleansing water. As they are being conveyed upward, said grains of sand rub against each other, and the scrubbing action thereof effectively removes the contaminants that are attached or coated thereon.

As opposed to a large scale water treatment plant as has been described above, filtration systems such as those installed in the filtration tanks of small scale simple plumbing or factories have within a container a filtration tank which holds the filtration media as well as the water to be purified by said filtration media. These filtration systems are structured to expel the water that has been purified by said filtration media from the filtration tank through a filtration floor to the outside of the container. It is common practice to utilize the surface washing or backwash methods for the filtration media of these filtration systems, and they have similar problems as those of the filtration reservoir; that is, the consumption of a large amount of purified water in the backwash process, and that the cleansing effectiveness is insufficient.

Further, as the filtration media in a filtration system is housed within a small container, the contamination thereof progresses at a higher rate than that of a filtration reservoir. Still further, as they perform high-speed filtration, contaminants are more likely to leak, so it can be said that said filtration media is operated under harsher conditions than that of a filtration reservoir. Therefore, it is necessary to replace or regenerate said filtration media on a shorter cycle.

It is conceivable to utilize the above-described sand cleansing apparatus by the present applicant (Japanese Unexamined Patent Publication Nos. 10(1998)-109051 and 11(1999)-057526) to cleanse the filtration media drawn from the filtration systems. However, compared to the amount of filtration media in a filtration reservoir, the amount of filtration media in a filtration system is extremely small, and the operational scale of same is also small. Therefore, it is inefficient and impractical to secure the space required to install the above-described sand cleansing apparatus, as well as expending costs for its installation and removal, to cleanse such a small amount of filtration media. As a practical matter, it is generally the case that the filtration media is replaced with new filtration media, as opposed to being reused after cleansing.

However, the filtration media to be disposed after being replaced must be dealt with as industrial waste, and the cost of such disposal is high. It is also preferable from an ecological viewpoint to switch from the easy trend of consume-then-dispose to a direction in which resources are recycled and reused.

In view of these points, there are known filtration apparatuses which have a filtration media cleansing mechanism provided within the filtration tank, such as the filtration devices disclosed in Japanese Patent No. 31491 and Japanese Utility Model Publication No. 63(1988)-98704. In the former filtration device, a central pipe is suspended from above a filtration compartment and positioned so that a lower opening of said pipe communicates with the interior of said compartment. Within the upper portion of the central pipe is provided a propulsion device in the form of a propeller. Higher still than said propulsion device is disposed a tube having a spray opening slightly above the central pipe, facing a lateral side thereof. The tube is linked to the propulsion device so that it rotates therewith, and sprays cleansing fluid at high speed from its spray opening by centrifugal force. To cleanse the filtration media, the propulsion device is rotated, thereby drawing the filtration sand into the central pipe through its lower opening. The filtration sand that has been propelled upward is expelled to the side of the central pipe by the cleansing fluid discharged from the spray opening of the tube. By this, the filtration sand is cleansed by the separation of the contaminants therefrom.

As to the latter filtration device, a pump pipe is suspended from above a tank so that it is positioned therein, and within this pipe is provided a rotatable spiral water pump. This filtration device is configured to perform a normal filtration operation by discharging untreated water into the filtration sand by an untreated water distribution tube placed within the filtration sand. This water travels upward through the filtration sand, is filtered thereby, and the resultant processed water is expelled from above said filtration sand. This filtration device is further configured to perform a cleansing operation by rotating the spiral water pump, raising the filtration sand which has acquired contaminants thereon, separating the contaminants from the filtration sand by the centrifugal separation phenomenon, and the resultant cleansed filtration sand is excelled through a filtration sand expulsion opening provided in the upper portion of the pump pipe.

Further, in the former filtration device, a normal filtration operation is performed by filtering untreated water provided from above through filtration sand placed on an apertured false bottom. The central pipe in this device has an open bottom; therefore it is always in the state that filtration sand is inside said pipe. However, the device is not constructed so that water flows into said central pipe and aggressively filtered therethrough. Further, to perform the cleansing operation, it is necessary to rotate the propulsion device at a rather high speed in order to draw up the filtration sand; therefore there is a fear that the filtration sand will be crushed upon impact with the propulsion device.

As to the latter filtration device, as it is of a upward flow type, that is, the filtration is performed by directing the stream of water from beneath the filtration sand upward, if the filtration speed is increased, the small grains of filtration sand are caused to float, increasing the space between said grains of filtration sand. As a result, contaminants, especially small particles thereof are insufficiently filtered, thereby decreasing the filtering performance. Also, when performing a cleansing operation, as a spiral water pump (screw) is rotated at high speed, the cleansing effect is low, and there is a fear that the filtration sand will be crushed upon impact with the spiral water pump as it rotates at high speed.

SUMMARY OF THE INVENTION

The present invention has been made in view of the above-described circumstances, and it is an object of the present invention to provide a filtration apparatus possessing both a high filtration performance property and a high cleansing performance property. Another object of the present invention is to provide a filtration apparatus that effectively cleanses filtration media without requiring the installation and removal of a cleansing apparatus each time that filtration media is to be cleansed.

The filtration apparatus of the present invention has a filtration media cleansing mechanism installed within the filtration tank. By utilizing said mechanism to cleanse the filtration media in the filtration apparatus, obviates the need to provide a specific space for a separate cleansing apparatus, as well as the need to install and remove such apparatus, while cleansing said filtration media in a short amount of time with a sufficiently high degree of cleansing.

The filtration apparatus of the present invention comprises: a container that houses a filtration tank which holds therein filtration media as well as the liquid to be filtered by said media; a filtration media cleansing mechanism having a hollow cleansing tank for cleansing the filtration media inside the filtration tank; wherein said filtration media cleansing mechanism is provided with a contaminant expulsion means for expelling the contaminants that have been separated from the filtration media to the outside of the container and also expels the liquid that has been purified by the filtration media to the outside of the container. Said cleansing tank is a hollow body erected within said filtration tank; has lower openings that are closed during a filtering operation and opened during a cleansing operation; has an upper opening at a level at least higher than the upper surface of the filtration media in the filtration tank; has provided therein a screw conveyor which conveys the filtration media as well as the liquid which flows into the cleansing tank upwards from the lower openings to the upper opening thereof while scrubbing said filtration media and said fluid. The rotation of said screw conveyor conveys the filtration media upwards, and discharges said media as well as the contaminants separated therefrom by the scrubbing action from the upper opening into the filtration tank.

Here, the liquid to be poured into the container is generally water to be purified by filtration, but it is not limited to this. For instance, waste oil of cutting lubricant may be used. Further, when water is used as the liquid, it is preferable to utilize filtration sand as the filtration media, but it is not limited to this. Many different materials may be used as the filtration media.

As the filtration media and the liquid is conveyed upwards by the screw conveyor, the filtration media is fluidized, the grains of the filtration media rub against each other, and the scrubbing action thereof effectively removes the contaminants that are attached or coated thereon. The contaminants removed in this manner floats in the liquid being conveyed upward, is discharged into the filtration tank from the upper opening of the cleansing tank, and is expelled outside the container by the contaminant expulsion means.

As the contaminant expulsion means, it is preferable to utilize a backwash mechanism that discharges filtered or clean liquid during a state when the lower openings of the cleansing tank are closed by the opening/closing means. The discharge of liquid by said backwash mechanism causes the contaminants, which are floating in the liquid surface layer within the filtration tank to be expelled through an overflow expulsion means. It is possible to effectively expel the contaminants, which have been separated from the filtration media, that remaining the filtration tank by utilizing the backwash mechanism equipped on the filtration apparatus to cleanse the filtration media therein.

Further, if the filtration media cleansing mechanism is of the type that does not have a water retention means to retain the liquid that has been poured into the container within the filtration tank, it is preferable to provide a retention means with a water retaining function. This is because it is possible to perform efficient cleansing utilizing only the retained water.

With regard to the filtration apparatus of the present invention, it is preferable to provide a switching mechanism for switching between the operations of "cleansing" by the filtration media cleansing mechanism and "filtering" of liquids. This is because it is possible to efficiently perform each of these operations by switching the switching mechanism to "filtering" when filtration of the liquid is to be performed, which precludes "cleansing" from being performed, and by switching the switching mechanism to "cleansing" when cleansing is to be performed, which precludes filtration from being performed.

As to the switching mechanism, it is preferable to utilize one that is equipped with a door that is of a sufficient size to close the lower openings of the cleansing tank and an opening/closing means for opening and closing same. This is because by the opening and closing operation of said door, it is possible to allow the filtration media and liquid to flow into the cleansing tank during a cleansing operation, and to positively prevent the filtration media from flowing into the cleansing tank during a filtration operation, thereby positively switching between the two operations (filtration and cleansing). Further, the screw conveyor and the lower and upper openings formed in the cleansing tank combine to provide the effect that the filtration media within the filtration tank progressively circulate within the filtration tank and the cleansing tank. This circulation makes thorough cleansing of the filtration media possible in a short time.

It is preferable to utilize a door, which is movable along an outer or inner periphery of the outer wall of the cleansing tank. This is to reduce the resistance of the filtration media accumulated within the filtration tank during an opening/closing operation. Similarly, it is also preferable to utilize a structure for the opening/closing means that easily overcomes the resistance of the filtration media. For example, a structure may be utilized such that a worm wheel is fixed on the outer peripheral surface of the door, and a motor or the like rotates the worm that engages said worm wheel. By this structure, the rotation of the worm scrapes out the filtration media, which had entered the spaces between the teeth of the worm wheel, and the resistance of the filtration media can be reduced during an opening/closing operation.

Note that of the filtration apparatus of the present invention, the filtration media cleansing mechanism and the switching mechanism that switches between "cleansing" of the filtration media by the cleansing mechanism and "filtering" as necessary provided in the filtration tank of the filtration apparatus, can be provided as an after market cleansing apparatus. By this, it becomes possible to customize an existing filtering apparatus to a filtering apparatus of the present invention, having the function of cleansing the filtration media, thereby controlling the installation cost.

Further, the filtration apparatus of the present invention comprises: a container that houses a filtration tank which holds therein filtration media as well as the liquid to be filtered by said media; a filtration media cleansing mechanism having a hollow cleansing tank for cleansing the filtration media inside the filtration tank, wherein said mechanism is provided with a contaminant expulsion means for expelling the contaminants that have been separated from the filtration media to the outside of the container; and a means for expelling the liquid that has been purified by the filtration media to the outside of the container. Said cleansing tank is a hollow body erected within said filtration tank; has lower openings that are open at all times; has an upper opening at a level at least higher than the upper surface of the filtration media in the filtration tank; has a plurality of lateral surface openings that extend in a vertical direction on a lateral surface thereof; said lateral surface openings having lateral surface doors opened and closed by a plurality of drive means. Said cleansing tank further has filtration media housed therein at all times; has provided therein a screw conveyor which conveys the filtration media as well as the liquid which flows into the cleansing tank upwards from the lower to the upper opening thereof while scrubbing said filtration media and said fluid. The rotation of said screw conveyor conveys the filtration media upwards, and discharges said media as well as the contaminants separated therefrom by the scrubbing action from the upper opening into the filtration tank.

With regard to the contaminant expulsion means, it may be of the type that utilizes a backwash mechanism. The backwash mechanism discharges filtered or clean water from the filtration floor into the filtration tank to float the filtration media during a closing operation of the lateral surface doors, performed in order for the screw conveyor to agitate the filtration media.

Further, during rotation of the screw conveyor, it is preferable that the lateral surface doors are closed.

The backwash mechanism of the contaminant expulsion means is structured to discharge filtered or clean liquid from the filtration floor into the filtration tank during an opening operation of the lateral surface doors, performed when the agitating operation is completed. Further, the contaminant expulsion means can be equipped with an overflow expulsion means that expels the contaminants caused to float in the liquid surface layer by the discharge of liquid by said backwash mechanism within the filtration tank to be expelled therethrough.

The filtration media cleansing mechanism can also be equipped with a retention means for retaining the liquid poured into the filtration tank therein.

When the filtration tank is filled with liquid, the liquid becomes pressurized. It is also possible to filter said pressurized liquid through the cleansing tank, as the filtration media is housed in the cleansing tank at all times.

The filtration apparatus of the present invention is equipped with a backwash mechanism that discharges filtered or clean liquid into the filtration tank through the filtration floor. During a cleansing operation, it is preferable that the lateral surface doors be closed after the filtration media is caused to be in a suspended state by said backwash mechanism.

Further, the contaminant expulsion means described above can be configured to expel the contaminants caused to float in the surface layer of the liquid by the discharge of filtered or clean liquid by the backwash mechanism after the agitating operation is complete and the lateral surface doors are opened.

Still further, the filtration media cleansing mechanism may be equipped with a retention means for retaining the liquid poured into the container. The agitating, scrubbing, and expelling operations may be performed using solely said retained liquid.

According to the filtration apparatus of the present invention, the cleansing tank is a hollow body having a plurality of lower openings, which are closed during a filtering operation and opened during a cleansing operation of filtration media as well as an upper opening that is positioned above the upper surface of the filtration media within this cleansing tank is equipped a screw conveyor that conveys the filtration media as well as the liquid upward through said tank from the lower openings to the upper opening thereof, while scrubbing the filtration media. As the cleansing tank is structured so that the rotation of the screw conveyor conveys the filtration media upward while scrubbing same, and said filtration media along with the contaminants separated therefrom are discharged into the filtration tank from an upper opening thereof, the following effects are obtained.

That is, during a normal filtering operation, the lower openings of the hollow body are closed, preventing the entrance of water and filtration sand therein, thereby precluding the accumulation of untreated water therein, as well as the deterioration of water quality by filtration sand that is not used for filtering. Further, the filtration media is entrained in vortices caused by the opposing forces of the downward pull of gravity and the upward motion imparted thereon by the screw conveyor. These vortices cause the contaminated grains of the filtration media to frictionally engage, that is, scrub each other, thereby separating contaminants therefrom, so it is possible to effectively separate the contaminants from the filtration media without the crushing thereof.

If a switching mechanism is further provided and in the case that "filtering" is selected by said mechanism, as the cleansing mechanism is not operated, a conventional filtering operation is secured. In the case that "cleansing" is selected, the cleansing mechanism is operated, and cleansing is performed utilizing only the water that is resident in the filtration tank, so the amount of water required is kept to a minimum. In addition, if as a final step, a backwash operation is performed to expel the contaminants which have been separated from the filtration media and remain in the filtration tank outside of the container, the filtration media can be cleansed more efficiently and with a higher degree of cleansing than by a conventional backwash operation.

As a result, the need to replace the filtration media with new filtration media is obviated; thereby suppressing the costs associated with the introduction of new filtration media. Also, the need to dispose of the used filtration media is obviated, and it becomes possible to maintain environmental protection standards (such as ISO14000) by the control of industrial waste, as well as reduce the costs associated with industrial waste disposal.

Further, as the intervals between the cleansing of the filtration media can be extended longer than with conventional systems, longer continuous filtration times can be secured, while decreasing the total time during which filtration is ceased for cleansing operations.

Still further, even if multiple cleansing operations are performed, contaminants do not accumulate within the filtration tank. Therefore, replacement of the filtration media and the cleaning of the filtration tank become unnecessary, thereby lowering the costs and labor associated with maintenance thereof.

Furthermore, as the filtration apparatus of the present invention is structured so that the cleansing tank houses therein filtration media at all times; said tank has a plurality of vertically extending lateral surface openings; said lateral surface openings have a plurality of lateral surface doors opened and closed by a plurality of drive means; the liquid poured into the filtration apparatus enters the cleansing tanks through said lateral surface openings, which are open in a normal operating state; and filtration occurs in the cleansing tank as well; then during a filtration operation, the filtration area is expanded, thereby improving the filtration efficiency. Also, as liquid flows into the cleansing tank at all times, stagnation of liquid therein is precluded. Therefore, contamination of liquid due to stagnation and the seeping out of said contaminated liquid from the cleansing tank into the filtered liquid and mixing therewith is prevented. Further, during a cleansing operation of the filtration sand, the lateral surface openings are closed, thereby allowing efficient circulation of the filtration sand between the cleansing tank and the container.

Further, in the case that the contaminant expulsion means is provided with a backwash mechanism that discharges filtered or clean water into the filtration tank through the filtration floor to cause the filtration media to float at the time when the lateral surface doors are closed in order for the screw conveyor to agitate the filtration sand, the opening and closing of the lateral surface doors is not prevented by the filtration media. That is, the lateral surface doors do not encounter much resistance by the filtration media, which eases the opening and closing operation, and the load on the drive means for opening and closing the lateral surface doors can be reduced.

Further, in the case that the lateral surface doors are closed during the time that the screw conveyor is rotating, agitating of the filtration media is efficiently performed.

In the case that the contaminant expulsion means is further provided with an overflow expulsion means that expels the contaminants caused to float within the surface layer of the liquid by the discharge of liquid from the backwash mechanism into the filtration tank through the filtration floor at the time when the lateral surface doors are opened at the completion of the agitating operation, not only is the opening of the lateral surface doors eased, but the contaminants can be efficiently discharged from the lateral surface doors as well.

In the case that the filtration media cleansing mechanism is further provided with a retention means for retaining the water poured into the container within the filtration tank, the effects of said means combine with those of the opening of the lateral surface doors to more efficiently cleanse the filtration media.

If the filtration apparatus is structured so that filtration media is housed in the cleansing tank at all times, the liquid under pressure by the filling of the filtration tank can also be filtered by the cleansing tank. In this case, because the liquid is under pressure, said liquid permeates the filtration media quickly, and because the filtration area is expanded, filtration is performed more efficiently.

The present invention, as has been described, is characterized by a cleansing mechanism being built in to a filtration tank so that both filtration and cleansing can be appropriately performed without sacrificing the performance of either.

BRIEF DESCRIPTION OF THE DRAWINGS

FIG. 5 is a view that describes a cleansing operation.

DESCRIPTION OF THE PREFERRED EMBODIMENTS

Figure 1:
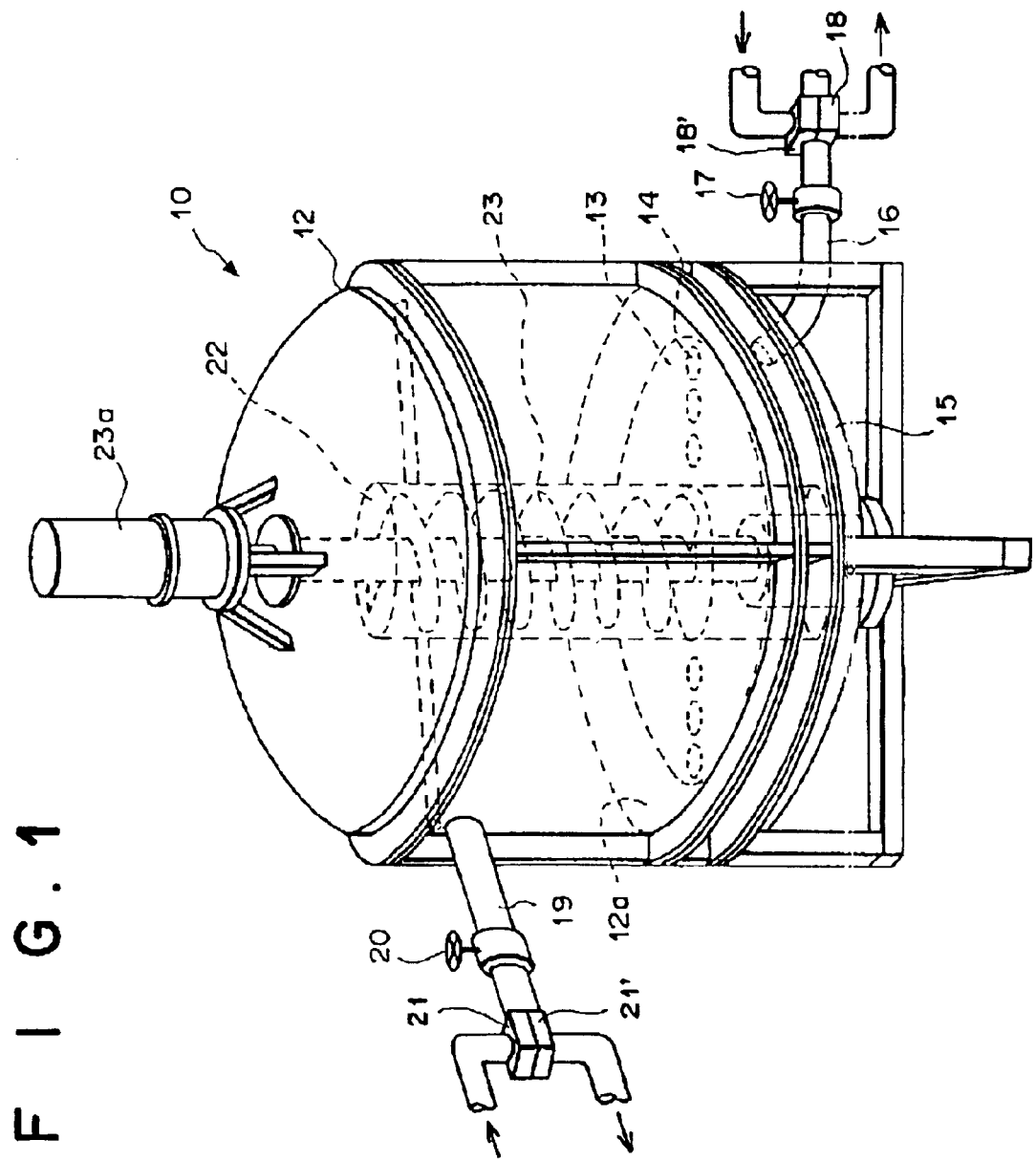
FIG. 1 is a perspective view showing a first embodiment of the filtration apparatus of the present invention.
Figure 2:
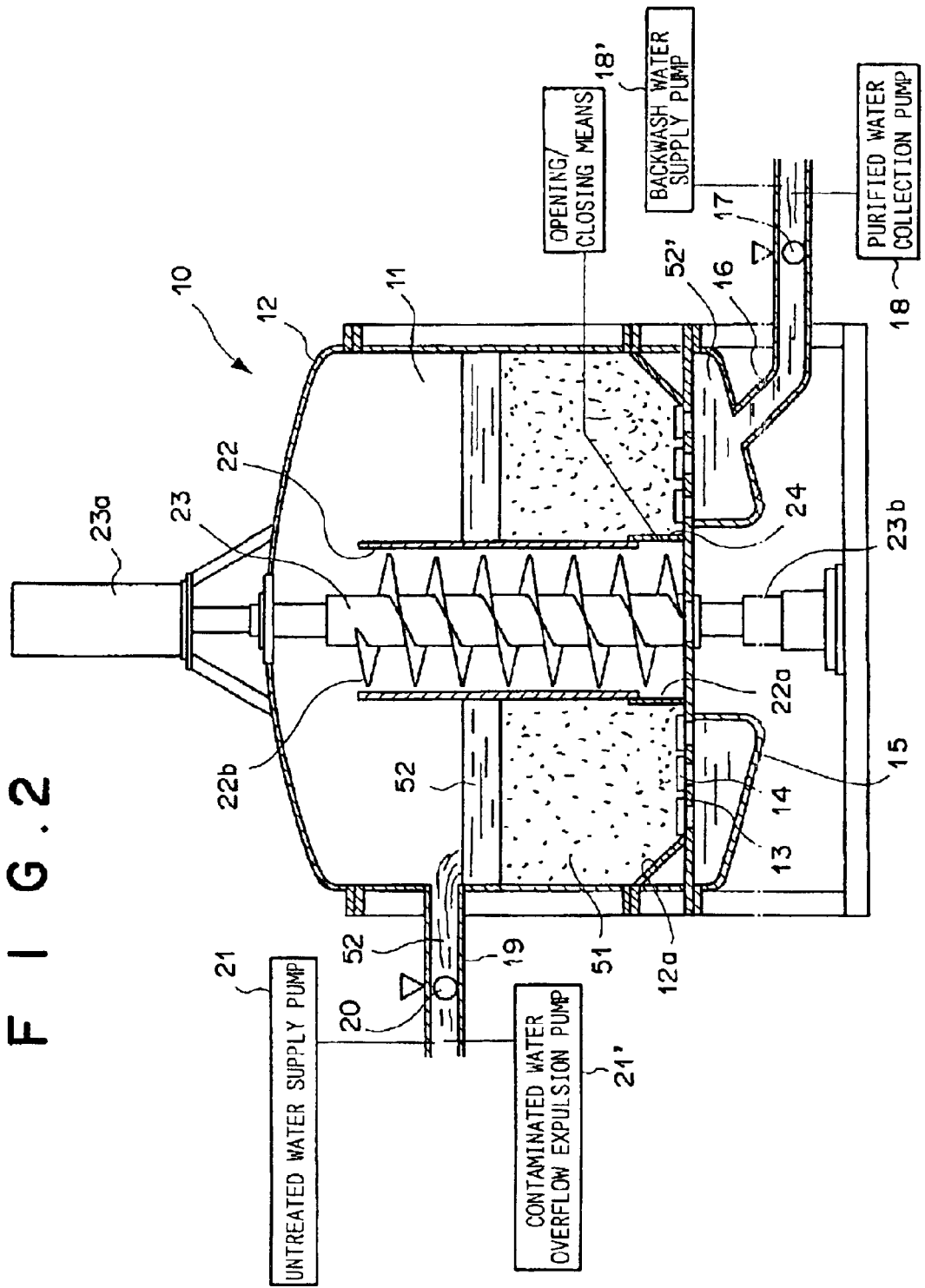
FIG. 2 is a vertical sectional view showing the essential elements of the filtration apparatus of FIG. 1.

The first embodiment of the filtration apparatus of the present invention, as shown in FIG. 2, comprises a main container 12 that houses a filtration tank 11 for housing therein filtration media 51 and water 52, poured therein to be filtered by said filtration media 51, structured to expel purified water 52' filtered by filtration media 51 to the outside of the main container 12 through a filtration floor 13 of the filtration tank 11; a filtration media cleansing mechanism within filtration tank 11 for cleansing filtration media 51; and a switching mechanism for switching between "cleansing" by the filtration media cleansing mechanism and "filtering". The specific construction of the filtration media cleansing mechanism and the switching mechanism will be described later.

Figure 3A:
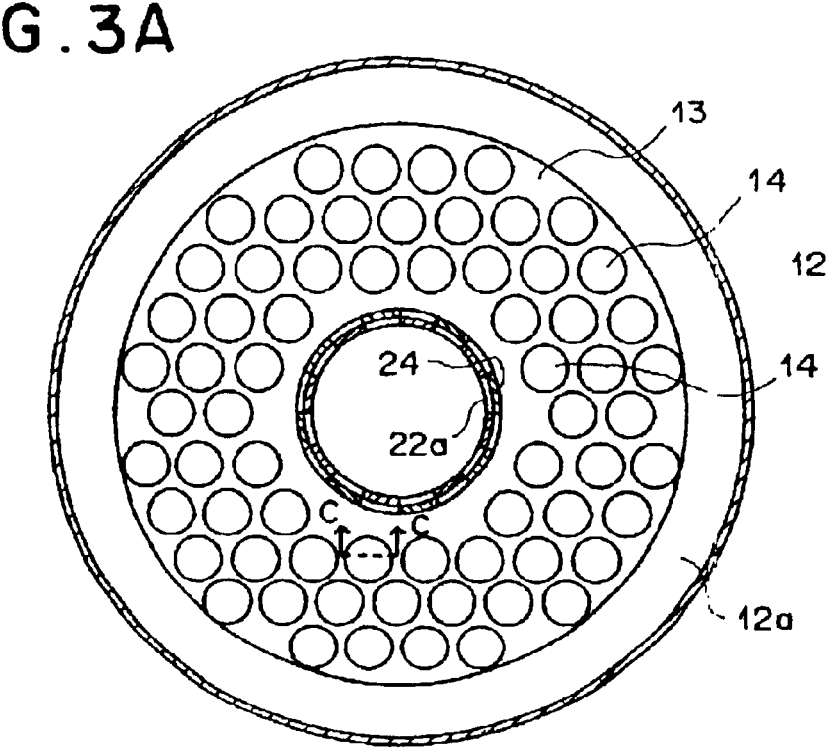
FIGS. 3A to 3C are detailed views showing the filtration floor and the filter.
Figure 3B:
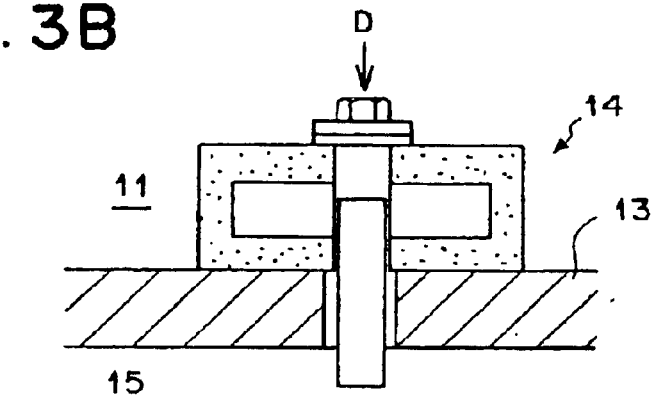
Figure 3C:
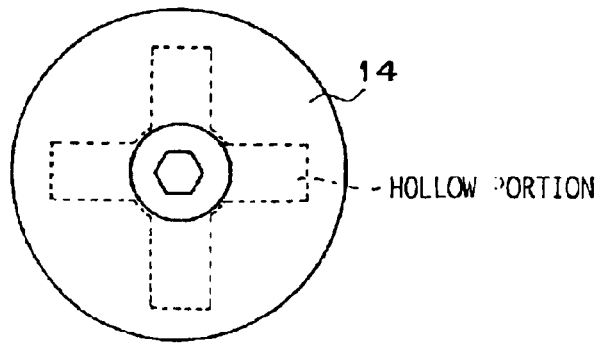

As shown in FIG. 3A, a plurality of short columnar filters 14, made of micro-apertured ceramic, are positioned on the filtration floor 13. These filters 14, as shown in the sectional view FIG. 3B as well as the plane view FIG. 3C, have a cross shaped hollow portion, and while maintaining strength against accumulating filtration media 51 and water 52', efficiently allow only the purified water 52' to penetrate to the pressure chamber 15 formed beneath filtration floor 13.

A water collection pipe 16 is fixedly attached to pressure chamber 15 to expel the purified water that has penetrated thereto to the outside of container 12. The water collection pipe 16 is equipped with an electromagnetic valve 17 (second electromagnetic valve) that opens and closes the inner portion thereof, a purified water collection pump 18 for drawing the purified water 52' from the pressure chamber 15, and a backwash water supply pump 18' for pumping purified water 52' to pressure chamber 15.

Figure 6:
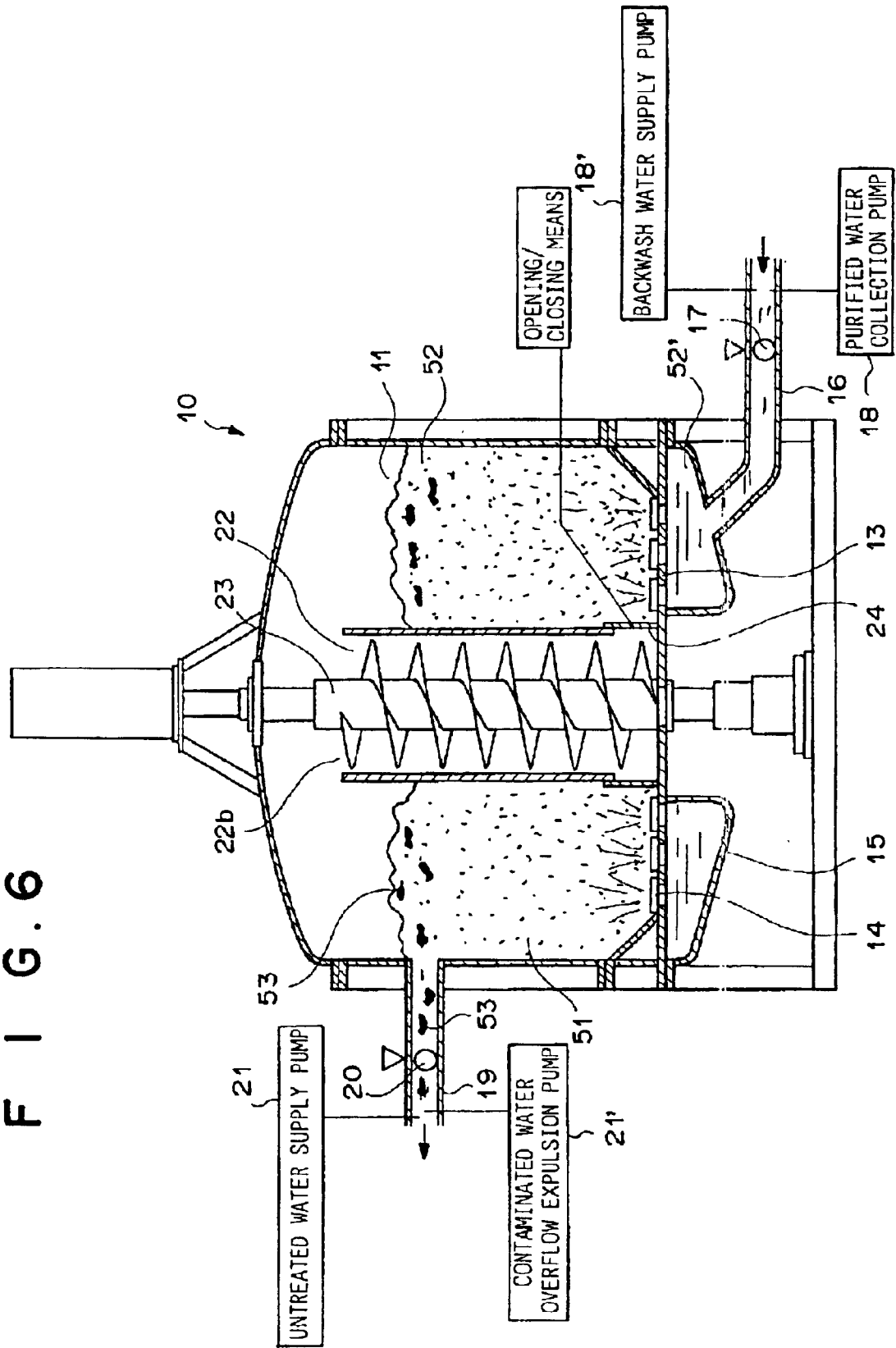
FIG. 6 is a view that describes the contaminant expulsion operation.

A supply pipe 19 that supplies water 52 to be purified by filtration to filtration tank 11 is fixedly attached on an upper lateral surface of container 12. The supply pipe 19 is equipped with an electromagnetic valve 20 (first electromagnetic valve) that opens and closes the inner portion thereof, an untreated water supply pump 21 for supplying water 52 to filtration tank 11, and a contaminated water overflow expulsion pump 21' for drawing water 52 having contaminants 53 (FIG. 6) to be described later floating therein from filtration tank 11.

The filtration media cleansing mechanism comprises a cleansing tank 22 that is a columnar hollow body with a plurality of lower openings 22a and an upper opening 22b erected within the filtration tank 11; a screw conveyor 23 which conveys the filtration media 51 as well as the water 52 which flows into the cleansing tank 22 from the filtration tank 11 upwards from the lower openings 22a to the upper opening 22b thereof while agitating said filtration media 51 and said water 52; a contaminant expulsion means to expel from the container 12 the contaminants 53 which have been separated from the filtration media 51 by the agitating operation performed thereon within cleansing tank 22; and a retention means to retain, to a certain degree, the water 52 supplied to container 12 therein.

The upper end of screw conveyor 23 is linked to a motor 23a disposed above the container 12, and the lower end of said screw conveyor is supported by a bearing 23b disposed below said container 12. Further, there is an appropriate amount of space between the spiral wing that is fixedly attached to the rotational axis of the screw conveyor and the inner surface of the cleansing tank 22, and it efficiently conveys the filtration media 51 to the upper opening 22b. If this space is too wide, then the amount of filtration media 51 that falls during the upper conveyance thereof becomes large, and if this space is too narrow, it causes the filtration media 51 to be ground and crushed, as well as causing wear of the wing. Therefore, it is preferable to adopt a structure in which either the screw conveyor 23 or the cleansing tank 22 are replaceable to maintain an appropriate amount of space therebetween, according to the particle size of the filtration media 51.

Figure 4A:
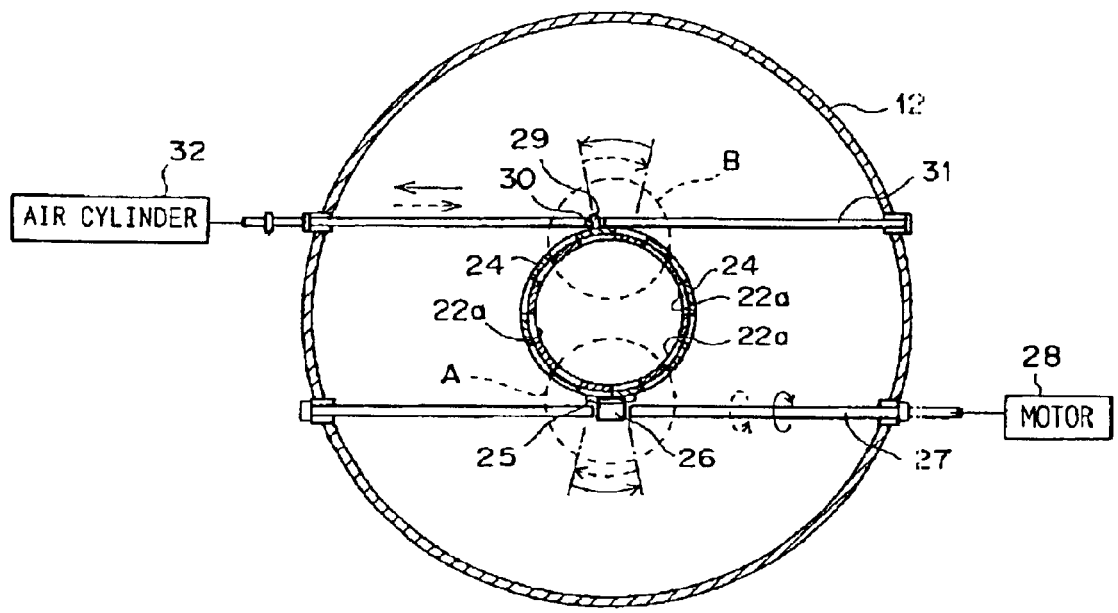
FIGS. 4A to 4C are detailed views showing an opening/closing door of the cleansing tank's lower opening and an opening/closing means therefor.
Figure 4B:
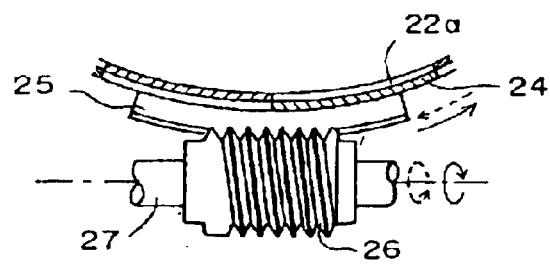
Figure 4C:
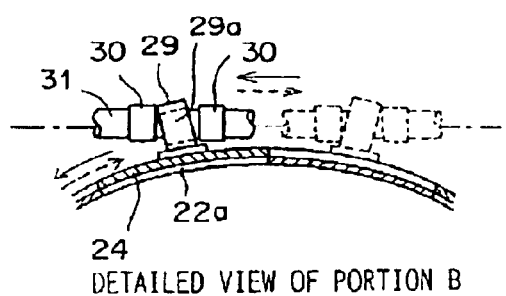

As shown in FIG. 4A, the switching mechanism comprises a door 24 movable along the outer peripheral wall of cleansing tank 22 of a sufficient size to close the lower opening 22a thereof; an opening/closing means to operate said door 24; and the above-described second electromagnetic valve 17 which acts as a retention means for retaining the water of container 12 within filtration tank 11 to a certain degree. Note that the opening/closing means comprises a worm wheel 25 fixedly attached along the outer peripheral surface of door 24; a worm 26 (see FIG. 4B) that engages said worm wheel 25; a rotation shaft 27 upon which said worm 26 is fixed; and a motor 28 that rotates said rotation shaft 27. As shown in FIG. 4A and FIG. 4C, it is also possible to utilize an opening/closing means comprising a hook 29 with an aperture 29a therethrough fixedly attached to the outer peripheral surface of door 24; a reciprocating shaft 31 that penetrates said aperture 29a, a pair of push-pullers (sleeves fitted on said shaft 31) disposed so as to sandwich said hook 29 therebetween; and an air cylinder 32 to impart reciprocating motion to the reciprocating shaft 31. Note that the air cylinder 32 may be provided in the vicinity of door 24 within the filtration tank 11.

The contaminant expulsion means comprises a backwash water supply pump 18' that discharges filtered water 52' into the filtration tank 11 from pressure chamber 15 through filtration floor 13 while the lower openings 22a of the cleansing tank 22 are closed by the opening/closing means; a suppler pipe 19 that acts as an overflow expulsion means for expelling the contaminants 53 which are caused to float in the water 52 within the filtration tank 11 by the discharge of purified water 52' by the backwash mechanism; and a contaminated water overflow expulsion pump 21'. Also, as the retention means, the second electromagnetic valve 17 performs the function thereof.

With regard to the filtration apparatus 10 of the first embodiment, an inclined plane 12a to assist the flow of the accumulated filtration media 51 and water 52 on the floor of the filtration tank into the lower openings 22a of the cleansing tank 22. However, a means to eject a stream in order to pressure the accumulated filtration media 51 and water 52 into the lower openings 22a can also be adopted. Further, without providing these specialized assistance mechanisms the accumulation of filtration media 51 on the floor of filtration tank 11 can be prevented by discharging purified water 52' from the filtration floor 13, thereby causing a convection current in said filtration media.

Next, the operation of the filtration apparatus of the first embodiment will be described.

First, a normal filtration operation will be described with reference to FIG. 2. The lower openings 22a of the cleansing tank 22 within container 12 are closed by door 24, and the accumulated filtration media 51 as well as water 52 supplied by the supply pipe 19 is prevented from flowing into the cleansing tank 22. If the lower openings 22a remain open at all times, there is a fear that partially filtered water may flow therein and stagnate in the cleansing tank 22, thereby lowering the water quality.

The first electromagnetic valve 20 of supply pipe 19 is open, and dirty water 52 sent pressurized by the untreated water supply pump 21 flows in said pipe 19. This water 52 passes through the first electromagnetic valve 20 and is supplied to filtration tank 11. The water 52 supplied to filtration tank 11 is purified by the filtering action of filtration media 51 accumulated therein. The purified water 52' passes through filters 14 of the filtration floor 13 and enters pressure chamber 15. The second electromagnetic valve 17 provided in the water collection pipe 16 that communicates with pressure chamber 15 is open. By operation of the purified water collection pump 18, the purified water 52' in pressure chamber 15 passes through water collection pipe 16 and is expelled out of the filtration apparatus 10, where it is provided for various uses.

Next, the switching of the apparatus to the "cleansing" operation as well as the filtration media cleansing operation will be described with reference to FIG. 2 and FIG. 5.

First, the operation of untreated water supply pump 21 is ceased, and the supply of water 52 is stopped. The first electromagnetic valve 20 is closed to prevent the spray of water 52 from entering the supply pipe 19 during the cleansing operation. At this time, the supply of water 52 is stopped so that the upper surface (surface of the water) thereof within the filtration tank 11 is not higher than the upper opening 22b of the cleansing tank 22. Note that the amount of filtration media 51 is set so that the top surface thereof is at a level below the upper opening 22b of cleansing tank 22, as well as below the supply pipe 19 that acts as the overflow expulsion means. It is often the case that if the weight ratio of filtration media 51 to water 52 is set high at this time, a higher cleansing effect is obtained.

Next, the operation of the purified water collection pump 18 is ceased, and the second electromagnetic valve, 17 is closed. By this, water 52' ceases to flow into the pressure chamber 15 via the filters 14, and the dirty water 52 supplied by the supply pipe 19 is retained in the filtration tank 11.

Also, operation of the motor 23a of the screw conveyor 23 is initiated, and the screw conveyor 23 rotates in the direction of the arrow shown in FIG. 5. Further, the door 24 is caused to move along the outer peripheral wall of cleansing tank 22 by the opening/closing means, and the lower openings 22a of the cleansing tank 22 are opened. Note that the order of the opening of the door 24 and the initiation of the screw conveyor 23 rotation may be reversed.

By the opening of door 24, the filtration media 51 and water 52 at the floor portion of filtration tank 11 is urged into the floor portion of cleansing tank 22 through the lower openings 22a thereof by the weight of filtration media 51 and water 52 accumulated above. Then, the filtration media 51 and water 52 that flows into the floor portion of cleansing tank 22 is progressively conveyed upwards by the spiral wing of screw conveyor 23 rotating inside cleansing tank 22. During this time the filtration media 51 is caused to be in a floating state by the upward force of the screw conveyor 23. At the floor portion of cleansing tank 22, the filtration media 51 is pushed upward in a state where it is restrained between the spiral wing of the screw conveyor 23 and the inner wall surface of the cleansing tank 22. Therefore, relative movement between the particles of filtration media 51 is suppressed. However, as this restraint decreases from an area above the upper edge of lower openings 22a along the screw conveyor 23, the water 52 and the filtration media 51 are conveyed upwards while being violently agitated. This agitation causes the particles of filtration media to rub against each other via the contaminants, and this action thoroughly separates and removes from the filtration media 51 the contaminants attached or coated thereon by the filtration of water 52, thereby cleansing the filtration media 51 without crushing thereof.

The cleansing effect of the particles of filtration media 51 conveyed by screw conveyor 23 is improved by the increased opportunities that said particles have to rub each other. Further, above the water's surface, the contact opportunities amongst said particles increase, so the cleansing effect is further improved. Also, with regard to the upper portion of the screw conveyor 23, a portion of the filtration media 51 falls through the space between the outer peripheral edge of the spiral wing and the inner surface of the cleansing tank 22, then is repeatedly conveyed upward by the wing at a lower level, so that the scrubbing process is substantively extended, improving the cleansing effect.

Note that it is necessary to set the rotation speed of the screw conveyor 23 to enable both the filtration media 51 and the water 52 to be conveyed to the upper edge of the spiral wing of the screw conveyor 23. Also, as to the water 52 poured in, an amount sufficient to fluidize the filtration media 51 therein at the upper opening 22b is necessary. However, if an excessive amount of water is poured in, the particle density of filtration media 51 on the screw conveyor 23 decreases. Consequently, the opportunities that said particles have to rub each other also decrease, and the cleansing effect is reduced. Further, within filtration tank 11, if the height difference between the upper opening 22b and the water 52 as well as the filtration media 51 is small, the cleansing effect of filtration media decreases. On the other hand, if said height difference is excessively large, the absolute amount of the filtration media 51 to be cleansed decreases, so that the cleansing efficiency deteriorates. Accordingly, all of these factors must be considered when setting parameters such as the amount of water 52 to be poured in and the height of the cleansing tank 22. The impact of the filtration media 51 on the water 52 as said filtration media 51 falls from a lateral side of upper opening 22b after being pushed out by the screw conveyor 23 facilitates the separation of contaminants therefrom.

The filtration media exhibits the effect that the particles thereof rub against each other as they are conveyed upward by the spiral wing of screw conveyor 23. However, as there is virtually no action in which said particles colliding with structural components such as the spiral wing, no excessive forces act thereon, and there is no fear that said particles will be crushed. Furthermore, as water 52 always exists among said particles, the contaminants 53 separated therefrom are mixed in the water 52, precluding re-attachment to the particles due to the rubbing action therebetween. Also, with regard to the middle to upper portions of the screw conveyor 23, as the filtration media 51 only contacts the upper surface of the spiral wing, there is little wear of the screw conveyor.

The fluidized filtration media 51, along with water 52 having contaminants 53 mixed therein, is conveyed to the upper opening 22b of cleansing tank 22 is progressively discharged into the filtration tank 11. The cleansed filtration media 51 progressively accumulates atop uncleansed filtration media 51 in the filtration tank 11. However, as the filtration media 51 accumulated on the floor portion of the filtration tank is progressively urged into the cleansing tank 22, the cleansed filtration media 51 repeatedly enters cleansing tank 22 through the lower openings 22a and is cleansed therein with the passage of cleansing time. Therefore, the filtration media 51 within filtration tank 11 is thoroughly cleansed.

Note that the filtration media 51 accumulated on the outer peripheral portion of the filtration tank 11 floor is urged toward the center of filtration floor 13, that is, towards the lower openings 22a of cleansing tank 22, by the weight of filtration media accumulated atop it of this weight, the urging is caused by the components that are in a direction along the inclined plane of inclined board 12a. Therefore, it is not the case that the filtration media 51 accumulated on the outer peripheral portion does not circulate, and is excluded from cleansing because it remains in said area; all of the filtration media is thoroughly cleansed.

After the filtration media 51 within filtration tank 11 has been thoroughly cleansed, the opening/closing means is operated to close the door 24 thereby closing the lower openings 22a. This prevents additional filtration media 51 and water 52 prevented from entering the cleansing tank 22. Then, rotation of the screw conveyor 23 is continued for a predetermined amount of time to expel the filtration media 51 and the water 52 having contaminants 53 therein that remain in the cleansing tank 22 out to the filtration tank 11.

By the operation described above, the cleansing of filtration media 51 itself is completed, and the contaminants 53 have been separated and removed therefrom. However, aside from the cleansed filtration media 51, the contaminants, which have been separated and removed therefrom, still remain in the filtration tank 11; therefore it would be inappropriate to perform further filtration on water 52 in this state.

So next, in order to perform a backwash operation, which acts as the rinsing process to expel the contaminants 53 that remain in filtration tank 11 out of the container 12, the second electromagnetic valve 17 provided in water collection pipe 16 is opened. At the same time, purified or cleaned water 52', provided from outside the container 12, is sent by pressure into pressure chamber 15 by the backwash water supply pump 18' (see FIG. 6). In addition, the first electromagnetic valve 20 provided in supply pipe 19 is also opened. The purified water 52' which has been sent by pressure to pressure chamber 15 is backwashed into the filtration tank 11 via filters 14 of the filtration floor 13 by the force of the pressure by which it was sent. By the upward force of the backwashed water 52', the filtration media 51 and the contaminants 53 accumulated therebetween rise violently in the water. At this time, contaminants 53 which are lighter than the filtration media 51 are propelled further upward than the filtration media 51, and are caused to float in the vicinity of the upper surface (surface of the water) of the water 52 (as well as 52'). As a result, the contaminants 53 are removed to within a range higher than the level where the filtration media 51 is propelled.

In this manner, by continuing the backwash discharge from the pressure chamber 15, the amount of water in filtration tank 11 increases. Consequently, the surface of the water (water level) gradually rises. Accordingly, the suspended contaminants 53 also rise within the filtration tank 11. When the surface of the water reaches the level of supply pipe 19 of container 12, the water 52 having contaminants 53 therein flow into said pipe. Here, the contaminated water overflow expulsion pump is operated to draw the water having contaminants 53 mixed therein out of supply pipe 19 and to be expelled outside of the container 12. By continuing the above described backwash operation for a predetermined amount of time, all of the contaminants 53 that remain in the filtration tank 11 are removed.

When the backwash operation is completed, the operations of contaminated water overflow expulsion pump 21' and the backwash water supply pump 18' are ceased. After the cleansed filtration media 51 which had been propelled upward sinks and accumulates in the filtration tank, the untreated water supply pump 21 provides new untreated water 52 to the filtration tank 11 to be filtered. At the same time, the purified water collection pump 18 expels the purified water 52' that has collected in the pressure chamber 15 out of the container 12, and filtration processes can be performed anew.

It is preferable from the viewpoint of saving labor that the series of operations described above be performed automatically by sequence control utilizing a predetermined control apparatus, thereby excluding an operator's trouble.

According to the filtration apparatus 10 of the first embodiment as described in detail above, the lower openings 22a of cleansing tank 22 are structured so that they can be opened and closed. When a normal filtration operation is performed, door 24 is closed to prevent the entrance of water and filtration sand into cleansing tank 22, thereby precluding the accumulation of untreated water therein, as well as the deterioration of water quality by filtrations and that is not used for filtering. Further, due to the provision of the filtration media cleansing mechanism and the switching mechanism within the filtration tank, there is no need to provide a filtration media cleansing apparatus separate from the filtration apparatus. That is, installation of equipment for removing filtration media 51 that has been dirtied by "filtration" from container 12, cleansing it, and returning it to the filtration tank 11 (such as a sand conveyance apparatus, a separate cleansing apparatus, etc.) is obviated, and the tremendous amount of labor associated therewith can also be reduced. As a result, the installation space, as well as the cost and labor associated with installation/removal of a separate filtration media cleansing apparatus is greatly reduced. Furthermore, when switched to the "filtration" mode by the switching mechanism, as the cleansing mechanism is not operated, a conventional filtration operation is secured. Also, because the retention means enables cleansing of the filtration media 51 with just the water 52 that is retained in filtration tank 11, the amount of water required can be kept to a minimum. Finally, by expelling the contaminants 53, which have been separated and removed from filtration media 51 but still remain in filtration tank out of container 12 by backwash, in comparison to conventional backwash or surface washing, the filtration media 51 can be cleansed more efficiently and with a higher degree of cleansing.

Figure 7:
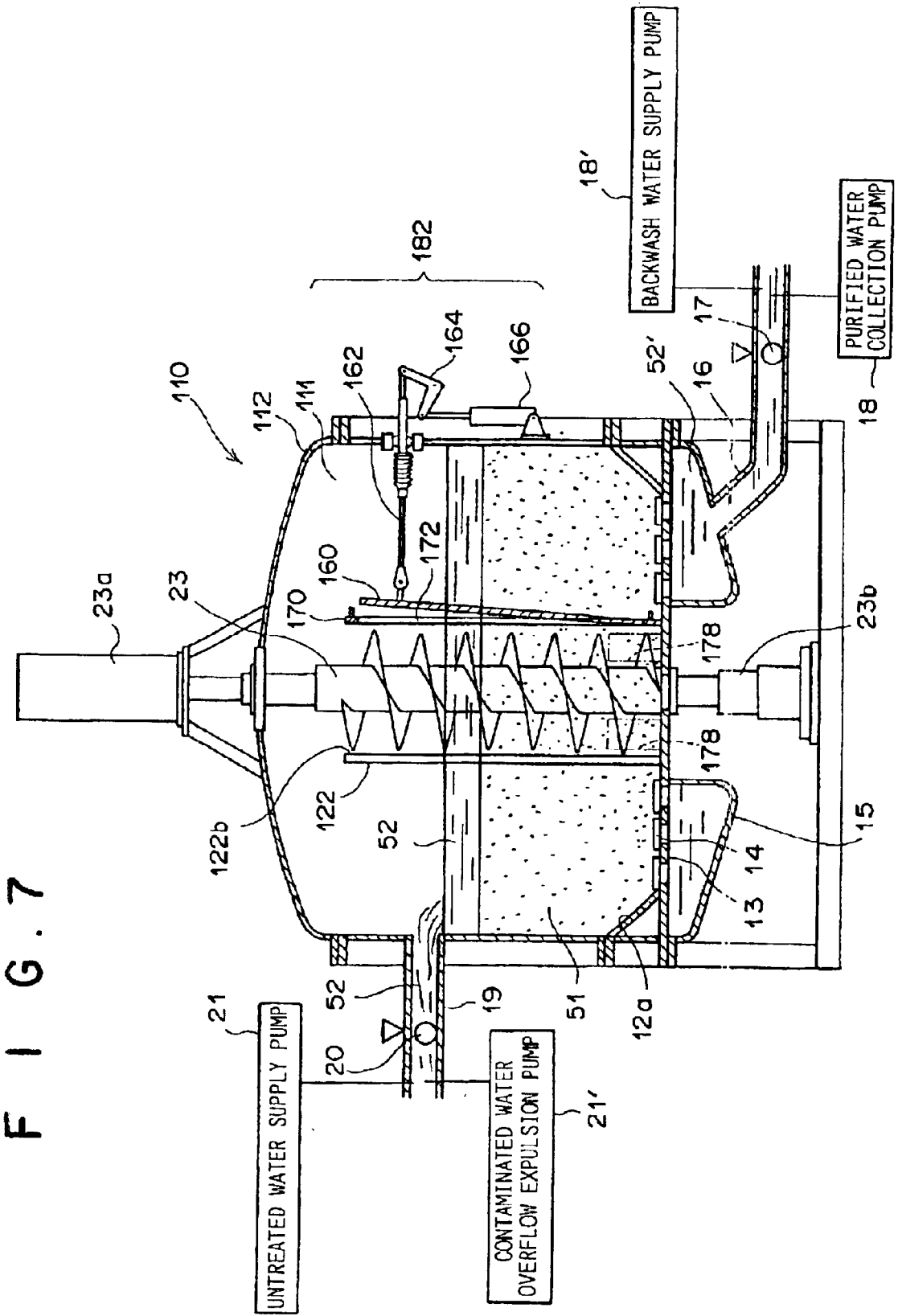
FIG. 7 is a vertical sectional view similar to FIG. 2, of a second embodiment of a filtration apparatus of the present invention.
Figure 8:
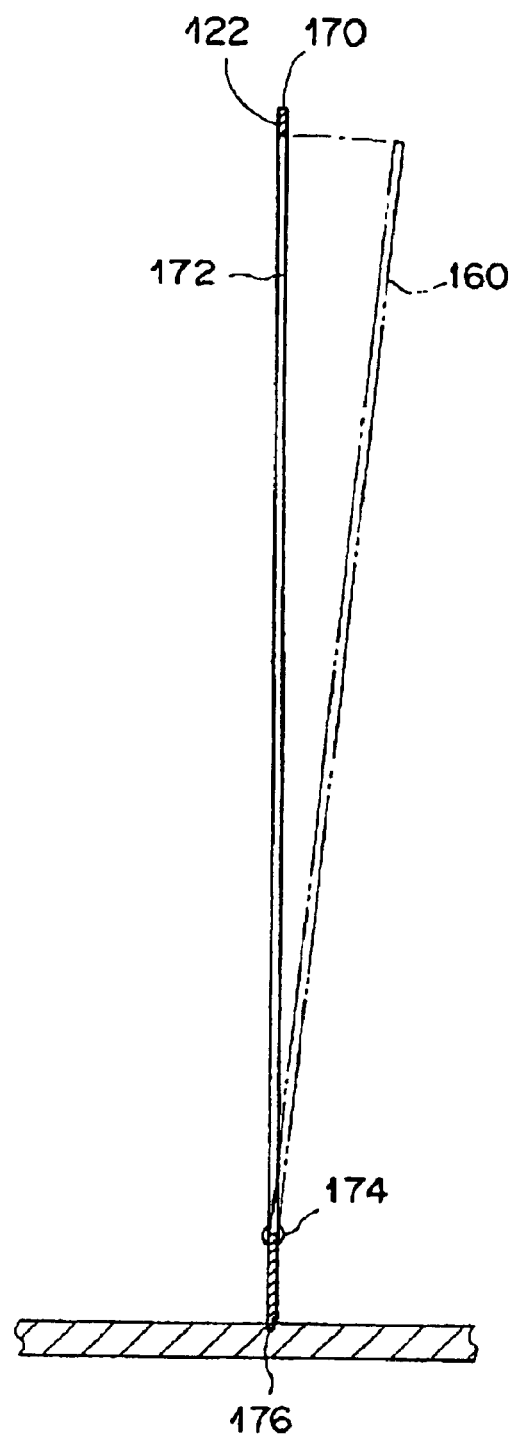
FIG. 8 is a partially magnified sectional view of a lateral surface door of the filtration apparatus of FIG. 7.
Figure 9:
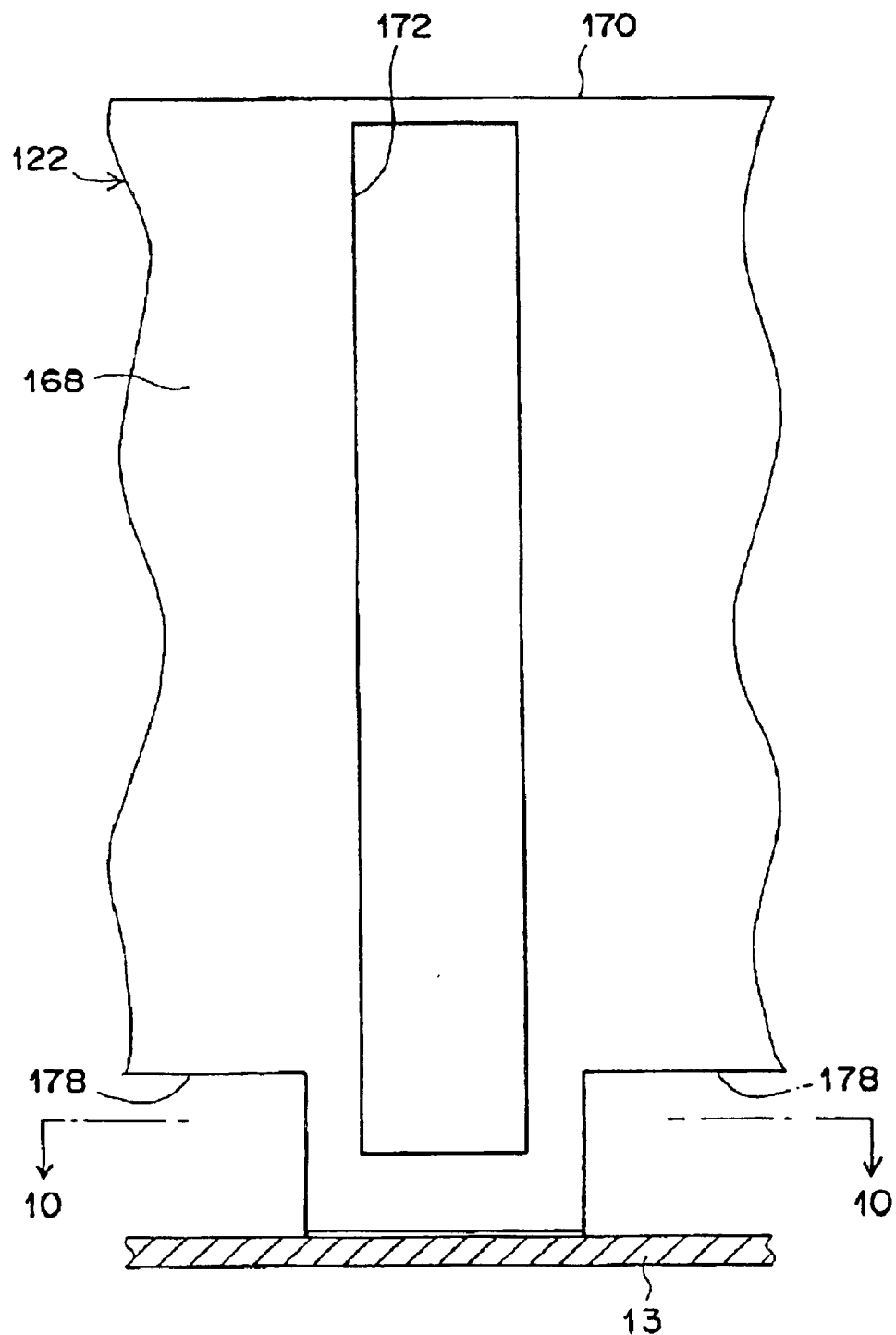
FIG. 9 is a partially magnified front view of a lateral surface opening of the filtration apparatus of FIG. 7.
Figure 10:
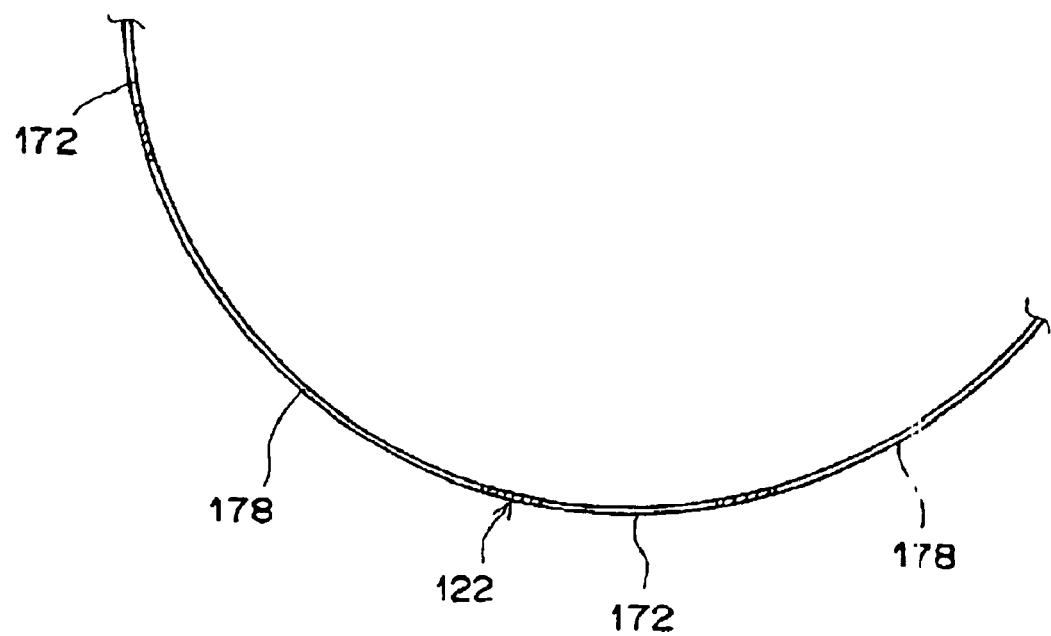
FIG. 10 is a partially magnified sectional view taken along the line 10—10 in FIG. 9 of the cleansing tank of the filtration apparatus.
Figure 11:
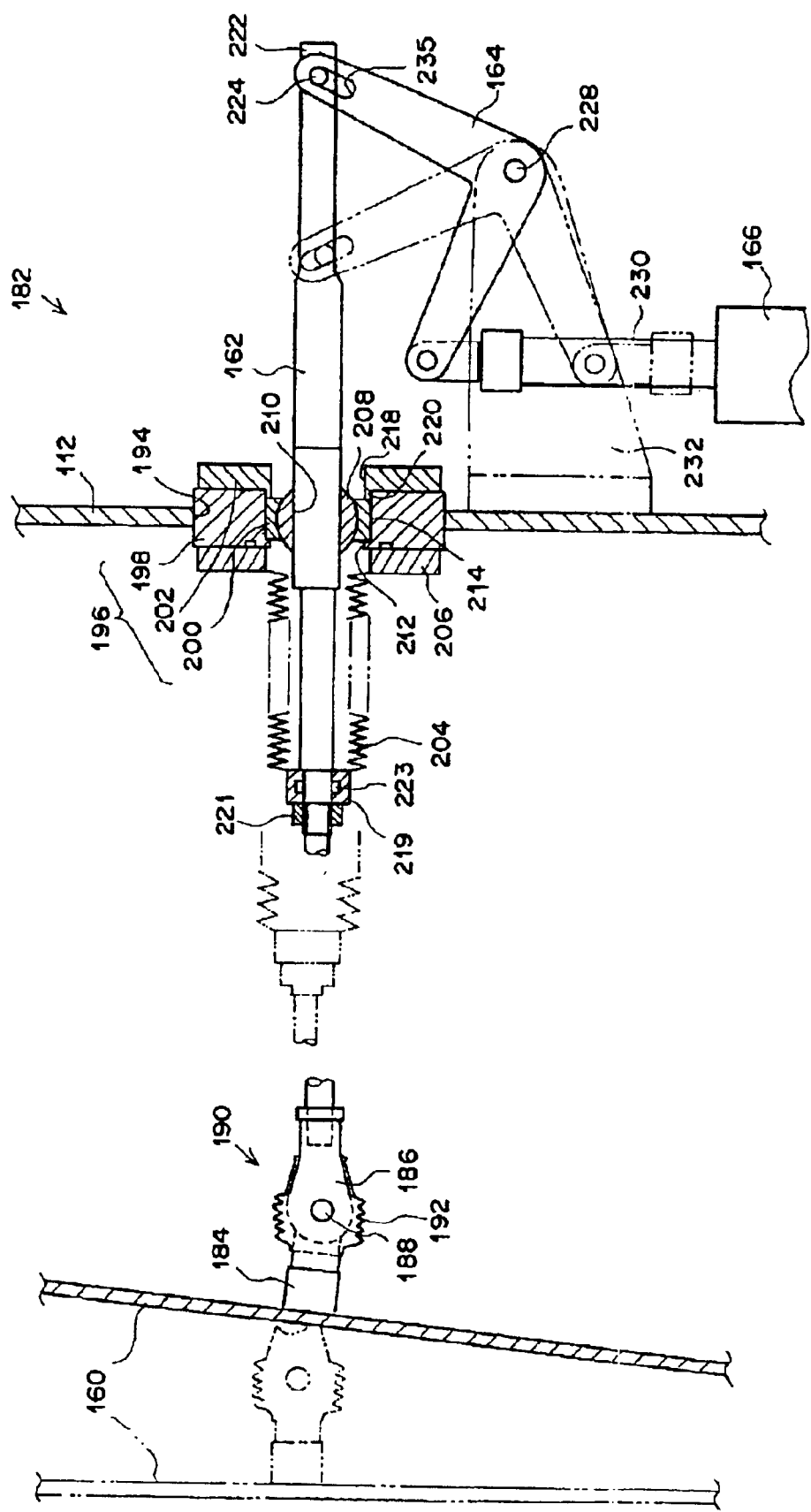
FIG. 11 is a magnified view of the essential elements of the drive means utilized in the filtration apparatus of FIG. 7.

Next, the second embodiment of the present invention will be described with reference to FIGS. 7 through 11. FIG. 7 is a sectional view similar to FIG. 2, showing the main components of the second embodiment of a filtration apparatus of the present invention. FIG. 8 is a partially magnified sectional view of a lateral surface door of the filtration apparatus of FIG. 7. FIG. 9 is a partially magnified front view of a lateral surface opening of the filtration apparatus of FIG. 7. FIG. 10 is a partially magnified sectional view taken along the line 10—10 in FIG. 9 of the cleansing tank of the filtration apparatus. FIG. 11 is a magnified view of the essential elements of the drive means utilized in the filtration apparatus of FIG. 7. Note that in the description, the same reference numbers will be utilized for elements that are the same as in the previously described first embodiment.

First, as shown in FIG. 7, the filtration apparatus 110 of the second embodiment houses filtration media 51 within the cleansing tank 122 even in a state of normal use, and differs from the first embodiment in that filtration is performed within cleansing tank 122 as well as in the main filtration tank 111. Another point of difference between the two embodiments is that in the second embodiment, a plurality of lateral surface doors 160, opened and closed by a plurality of drive means 182, is mounted on the cleansing tank 122. Each of these lateral surface doors 160 are linked to an operating rod (hereinafter referred to as rod) 162 that extends to the outside of container 112. A link 164, which is linked to the rod 162, and an air cylinder 166 that drives said link 164 are mounted on the outer surface of container 112. This rod 162, link 164, air cylinder 166 as well accessories therefore will be collectively referred to as the drive means 182. The air cylinder 166 is provided on the outside of container 112 for each lateral surface door 160. Note that in FIG. 7, for the sake of simplicity in the description, only one pair of lateral surface door 160 and drive means 182 is shown.

A detailed description of the lateral surface door 160 will be given with reference to FIGS. 8 through 10. As shown best in FIG. 9, a thin rectangular lateral surface opening 172 that extends from the vicinity of the filtration floor 13 to the upper edge 170 of the cleansing tank is formed on the lateral surface 168 of the cylindrical cleansing tank 122. This lateral surface opening 172 is formed in four positions along the circumference of cleansing tank 122, at 90° intervals. A thin rectangular lateral surface door 160, matching the lateral surface opening is hingedly attached to a hinge portion 174 so as to be able to open and close the lateral surface opening.

Lateral surface door 160 is formed to have substantially the same curvature as the outer form of cylindrical cleansing tank 122. However, the lower edge of said door 160 is formed as a straight line, and hinge portion 174 (see FIG. 8) is formed thereon. The lower edge of the lateral surface opening is similarly formed as a straight line, and constitutes a part of the hinge portion 174. Also, a plurality of rectangular cutouts (lower opening) 178 are formed along the lower edge of cleansing tank 122 in the space between adjacent lateral surface openings 172. These cutouts 178 are formed in four positions along the circumference of cleansing tank 122, in evenly spaced intervals. Cutouts 178 perform the same function as the lower openings 22a of the previously described first embodiment, however, there is no cover for said cutouts 178, and they remain open at all times.

During a filtration operation, the lateral surface doors 160 are in an open state so that water 52 is evenly distributed to all of the filtration media 51. The water 52 that flows into cleansing tank 122 permeates and is filtered by the filtration media 51 therein, and flows out therefrom through cutouts 178. Accordingly, because in the second embodiment, the filtration of water 52 is performed in the cleansing tank 122 as well as in the filtration tank 111, the filtration ability of filtration apparatus 110 is improved.

Next, the drive means 182 that opens and closes lateral surface doors 160 will be described with reference to FIG. 11. A fixed bracket 184 is attached to the upper outer surface of the lateral surface door 160 by screws or by welding. The distal end of this fixed bracket 184 is formed to be a vertically extending plane. On the other hand, a two pronged linkage member 186 is attached by screws or the like on the distal tip of the rod 162 that is positioned within the container 112. The fixed bracket 184 and the two pronged linkage member 186 constitute a rotatable yet integral linkage portion 190 by being attached by a pin 188. The outside of this linkage portion 190 is covered by a metal bellows 192 capable of compression and expansion constructed from stainless steel or the like, to protect said linkage portion 190 from the water 52 and filtration media 51. With regard to FIG. 11, lateral surface door 160 is shown in its open state by solid lines, and in its closed state by broken lines. The rod 162 and its parts are also drawn by solid lines and broken lines in positions that correspond to the open and closed states thereof. Note that with regard to FIG. 11, the end of rod 162 that extends into the container 112 will be omitted except for the linkage portion 190.

A support member 196 that supports the rod 162 is mounted in the attachment aperture 194 formed in a lateral surface of container 112. The support member 196 comprises a bearing 200; a support body 198 that supports said bearing 200 mounted within the aperture 194; a holding member 202 that holds said bearing 200 from outside the container 112 attached on a lateral surface of the support body 198; and a bellows attachment member 206 fixed by the support body 198 inside the container 112 that fixes a bellows 204 to be described below.

The support body 198 is a metal disc with a circular aperture 214 in the center thereof, and is welded to the container 112. On the inner edge of the aperture 214, that is, on the side that is inside the container 112, is formed an annular flange. The inner surface of bearing 200 is curved, and structured to hold rotatably therein a ball joint 208 having a similar curvature. The bearing 200 is positioned within the aperture 214 of support body 198. The holding member 202 is fixed on the outside of support body 198 by screws. The holding member 202 is a disc-shaped metal member having a circular aperture, and an annular rib 220 is protrusively formed on the inner edge of said aperture. The bearing 200 is held by this rib 220 and the aforementioned flange 212 of support body 198. The ball joint 208 is a spherical metal member having a penetrative aperture 210 in the center thereof through which rod 162 in inserted. Said balljoint 208 is supported by bearing 200 in an angularly variable manner. The rod is slidably supported within this penetrative aperture 210, while being supported in an angularly variable manner with respect to the container 112.

A metal bellows 204, similar to the aforementioned bellows 192 is fitted on the inside of container 112 in the vicinity of the rod support member 196. This bellows 204, like bellows 192, is capable of compression and expansion in an axial direction of rod 162. The front end of bellows 204 is welded to a cylindrical member 219 fixedly fitted onto rod 162, and the rear end is welded to the bellows attachment member 206. The cylindrical member 219 is secured to the rod 162 by a nut 221 engaged to same. Also, within said cylindrical member 219 is disposed packing 223 that presses against the periphery of rod 162. This structure protects the bearing 200 from liquids such as water and from filtration media 51.

A protrusion 224 is protrusively formed on the proximal tip portion 222 of rod 162. Said protrusion 224 is engaged by an opening 235, formed at one end of L-shaped link 164. Link 164 is supported by shaft 228, and the other end of link 164 is linked to the operating shaft 230 of air cylinder 166. The shaft 228 of link 164 is mounted on a bracket 232 mounted on the outer surface of container 112. This structure enables link 164 to convert the compression/expansion motion of the operating shaft 230 to a horizontal motion of the rod 162 as shown in FIG. 11, thereby opening and closing lateral surface door 160.

Next, the method (process) of cleansing the filtration media 51 by the second embodiment will be described. First, as in the previously described first embodiment, operation of the untreated water supply pump 21 is ceased, thereby stopping the supply of water 52. The first electromagnetic valve 20 is closed to prevent the spray of water 52 from entering the supply pipe 19 during the cleansing operation. At this time, the supply of water 52 is stopped so that the upper surface (surface of the water) thereof within the filtration tank 11 is not higher than the upper opening 122b of the cleansing tank 122. As in the previously described first embodiment, the amount of filtration media 51 is set so that the top surface thereof is at a level below the upper opening 122b of cleansing tank 122, as well as below the supply pipe 19 that acts as the overflow expulsion means.

Next, the operation of the purified water collection pump 18 is ceased, and the second electromagnetic valve 17 is closed. By this, water 52' ceases to flow into the pressure chamber 15 via the filters 14, and the dirty water 52 supplied by the supply pipe 19 is retained in the filtration tank 111.

Then, the second electromagnetic valve 17 is opened, and purified or cleaned water 52', provided from outside the container 112, is sent by pressure into pressure chamber 15 by the backwash water supply pump 18'. The water 52' is backwashed into filtration tank 111 and causes the filtration media 51 to be in a suspended state. At this time, air cylinder 166 is driven so as to close lateral surface doors 160, and operation of the motor 23a of screw conveyor 23 is initiated. It is preferable to close the lateral surface doors 160 and initiate the operation of screw conveyor 23 while the filtration media 51 is in a suspended state. This is because in this state, the load on the air cylinder 166 and screw conveyor 23 by filtration media 51 can be minimized. After lateral surface doors 160 are closed, operation of the backwash water supply pump 18' is ceased.

As the screw conveyor 23 rotates, the filtration media 51 within cleansing tank 122 is pushed upward while the trains thereof scrub against each other. Meanwhile, as in the previously described first embodiment, filtration media 51 is urged into the bottom portion of cleansing tank 122 through the open cutouts 178. The filtration media 51, as well as water 52, that flows into the bottom portion of cleansing tank 122 is progressively conveyed upward by the spiral wing of the screw conveyor 23 to the upper opening 122b. The mode in which the contaminants 53 that are attached to or cover the filtration media 51 is separated and removed therefrom is the same as in the first embodiment.

The rotation speed of screw conveyor 23 is set similarly as in the previously described first embodiment. The fluidized filtration media 51 and the water 52 having contaminants 53 therein are conveyed to the upper opening 122b of cleansing tank 122 and progressively discharged into filtration tank 111. The cleansed filtration media 51 progressively accumulates atop uncleansed filtration media 51 in the filtration tank 111. However, the cleansed filtration media 51 repeatedly enters cleansing tank 122 through the cutouts 178 and is cleansed therein with the passage of cleansing time. This process is similar to that of the first embodiment, in which filtration media repeatedly enters cleansing tank 22 through lower opening 22a and is cleansed therein.

After the filtration media 51 within filtration tank 111 has been thoroughly cleansed, the lateral surface doors 160 are opened by the drive means 182. Before lateral surface doors 160 are opened, it is preferable that filtration media 51 be caused to be in a suspended state. This can be accomplished by opening the second electromagnetic valve 17, and sending purified or cleaned water 52', provided from outside the container 112, by pressure into pressure chamber 15 by the backwash water supply pump 18'. As stated previously, this is to reduce the load of the filtration media 51 on the air cylinder 166. At this time, filtration media 51 remains in the cleansing tank 122.

Next, a rinsing process is performed by sending purified or cleaned water 52', provided from outside the container 112, by pressure into pressure chamber 15. At this time the screw conveyor 23 can be stopped, but it can also be kept in an operating state for a predetermined amount of time to efficiently discharge the contaminants 53 of filtration media 51 from within cleansing tank 122. Then, the first electromagnetic valve 20 provided in supply pipe 19 is opened, and the water 52 having contaminants 53 therein is expelled to the supply pipe 19 that acts as the overflow expulsion means. Note that at this point, filtrate discharge is performed for a short amount of time during an initial filtration step.

The filtration apparatus 110 of the second embodiment has the same operational effects as that of the first embodiment, without the need to install a separate cleansing apparatus. In addition to the advantageous effects of the first embodiment, the second embodiment further improves filtration efficiency by performing filtration in the cleansing tank 122 as well, thereby utilizing the entire filtration tank for filtration. Also, as water flows through cleansing tank 122 at all times, the seepage of dirty water from cleansing tank 122 can be prevented. Further, filtration of water 52 and cleansing can be performed efficiently due to the opening/closing lateral surface doors 160. That is, during filtration, lateral surface doors 160 are opened to allow water 52 to flow into the cleansing tank 122 to perform filtration therein, while during cleansing, the lateral surface doors 160 are shut to efficiently perform cleansing of the filtration media therein.

Further, it is also possible to perform filtration through cleansing tank 122 in a state wherein water 52 in filtration tank 111 is pressurized by the filling thereof. In this case, as filtration occurs under pressure, the permeation of water 52 is averaged, and combined with the filtration that occurs in cleansing tank 122, the filtration efficiency improves, and provides the effect that the processing ability is increased. In the case that filtration is performed under pressure, the lateral surface doors 160 may be closed. Even in the case that filtration is performed under pressure, before a cleansing operation, the pressure is removed, and a cleansing operation as described above is performed in a state where the water level is lowered. Also, if the apparatus is to be used under pressure, it is preferable to provide stays (linkage members) to link the cleansing tank 122 with container 112, so as to prevent the deformation of cleansing tank 122 as well as bloating of container 112.

Further, one air cylinder 166 is provided for each lateral surface door 160, but a structure may be adopted in which one air cylinder is driven to open and close all of the lateral surface doors 160 via links. In addition, it need not be said that the number of lateral surface openings 172 as well as lateral surface doors 160 is not limited to that of the present embodiment, and can be set as appropriate.

The present invention has been described in detail, but the spirit of the present invention is not limited to the above-described embodiments. For example, the diameter of the cleansing tank can be formed to be larger or smaller according to the degree of contamination of the liquid. Alternatively, the cleansing tank and the screw conveyor may be made larger to abbreviate the cleansing time.

What is claimed is:

1. A filtration apparatus comprising:
a container that houses a filtration tank that holds therein filtration media and liquid to be filtered by said filtration media;
a filtration media cleansing mechanism having a hollow cleansing tank for cleansing the filtration media inside the filtration tank, said filtration media cleansing mechanism being provided with a contaminant expulsion means for expelling the contaminants that have been separated from the filtration media to the outside of the container; and
a means for expelling the liquid that has been purified by the filtration media to the outside of the container;
wherein said cleansing tank is a hollow body erected within said filtration tank;
has a plurality of lower openings configured to be closed by an opening and closing means during a filtering operation and configured to be opened by the opening and closing means during a cleansing operation, the opening and closing means comprising a door and one of a motor and an air cylinder;
has an upper opening at a level at least higher than the upper surface of the filtration media in the filtration tank;
has provided therein a motor-driven screw conveyor which conveys the filtration media as well as the liquid which flows into the cleansing tank upwards from the lower openings to the upper opening thereof while scrubbing said filtration media and said fluid;
wherein said screw conveyor is configured to be rotated such that the filtration media is conveyed upwards, and such that said media as well as the contaminants separated therefrom by the scrubbing action are discharged from the upper opening into said filtration tank.

2. A filtration apparatus as defined in claim 1, wherein said contaminant expulsion means comprises:
a backwash mechanism that discharges filtered or unfiltered clean liquid into said filtration tank through the filtration floor while the lower openings of the cleansing tank are closed by an opening/closing means; and
an overflow expulsion means for expelling the contaminants which are caused to float in the surface layer of the water within the filtration tank by the discharge of said liquid by said backwash mechanism.

3. A filtration apparatus as defined in either of claim 1 or 2, wherein said filtration media cleansing mechanism further comprises a retention means for retaining liquid poured into said container within said filtration tank.

4. A filtration apparatus as defined in either of claim 1 or 2, further comprising a switching mechanism that switches between the operating states of filtration and cleansing by said filtration media cleansing mechanism.

5. A filtration apparatus as defined in claim 4, wherein said switching mechanism comprises:
a door free to open and close of a sufficient size to shut said lower openings; and
an opening/closing means for opening and closing said door.

6. A filtration apparatus as defined in claim 5, wherein said door is movable along an inner or outer periphery of an outer wall of said cleansing tank.

7. A filtration apparatus comprising:
a container that houses a filtration tank which holds therein filtration media as well as the liquid to be filtered by said media;
a filtration media cleansing mechanism having a hollow cleansing tank for cleansing the filtration media inside the filtration tank, said mechanism being provided with a contaminant expulsion means for expelling the contaminants that have been separated from the filtration media to the outside of the container; and
a means for expelling the liquid that has been purified by the filtration media to the outside of the container;
wherein said cleansing tank is a hollow body erected within said filtration tank;
has a plurality of lower openings that are open at all times;
has an upper opening at a level at least higher than the upper surface of the filtration media in the filtration tank;
has a plurality of lateral surface openings that extend in a vertical direction on a lateral surface thereof, said lateral surface openings having a plurality of lateral surface doors opened and closed by a plurality of drive means;
has filtration media housed therein at all times;
has provided therein a motor-driven screw conveyor which conveys the filtration media as well as the liquid which flows into the cleansing tank upwards from the lower openings to the upper opening thereof while scrubbing said filtration media and said fluid;
wherein liquid poured into said container enters the cleansing tank through the lateral surface doors, which are open during a normal operating state, thereby performing filtration within said cleansing tank as well as in the filtration tank, and wherein said screw conveyor is configured to be rotated such that the filtration media is conveyed upwards, and such that said media as well as the contaminants separated therefrom by the scrubbing action are discharged from the upper opening into said filtration tank during a cleansing operation.

8. A filtration apparatus as defined in claim 7, wherein said contaminant expulsion means is provided with a backwash mechanism that discharges filtered or unfiltered clean water into the filtration tank through the filtration floor to cause the filtration media to be in a suspended state at the time when said lateral surface doors are closed in order for the screw conveyor to agitate the filtration media.

9. A filtration apparatus as defined in either claim 7 or 8, wherein during the rotation operation of screw conveyor, the lateral surface doors are closed.

10. A filtration apparatus as defined in claim 7 wherein said contaminant expulsion means comprises:
a backwash mechanism that discharges filtered or unfiltered clean liquid into said filtration tank through the filtration floor at the time when said lateral surface doors are opened to open said lateral surface openings when said agitation operation is completed; and
an overflow expulsion means for expelling the contaminants which are caused to float in the surface layer of the water within the filtration tank by the discharge of said liquid by said backwash mechanism.

11. A filtration apparatus as defined in claim 7 wherein said filtration media cleansing mechanism further comprises a retention means for retaining the liquid poured into said container within said filtration tank.

12. A filtration apparatus as defined in claim 1, wherein the opening and closing means further comprises a rotation shaft driven by the motor, a worm wheel coaxially fixed to the rotation shaft, and a worm engaging the door.

13. A filtration apparatus as defined in claim 1, wherein the opening and closing means further comprises a hook fixedly attached to the outer peripheral surface of the door and engaged with a reciprocating shaft, the reciprocating shaft being driven by the air cylinder.

* * * * *